United States Patent [19]

Zirngibl

[11] 4,005,069
[45] Jan. 25, 1977

[54] AZO DYES HAVING A 3-HALO-4-CYANO OR ACYL-6-HYDROXYPYRIDONE-2 COUPLING COMPONENT RADICAL

[75] Inventor: Ulrich Zirngibl, Binningen, Switzerland

[73] Assignee: Sandoz Ltd., Basel, Switzerland

[22] Filed: Feb. 18, 1975

[21] Appl. No.: 550,512

Related U.S. Application Data

[63] Continuation of Ser. No. 253,410, May 15, 1972, abandoned.

[30] Foreign Application Priority Data

May 18, 1971 Switzerland ..........................7276/71

[52] U.S. Cl. .................. 260/156; 260/155;
260/247.2 A; 260/293.69; 260/294.8 D;
260/294.9; 260/295.5 R; 260/295.5 A;
260/296 R
[51] Int. Cl.² .................. C09B 29/36; C09B 43/00
[58] Field of Search .............................. 260/156, 155

[56] References Cited
UNITED STATES PATENTS

| | | | |
|---|---|---|---|
| 3,640,674 | 2/1972 | Berrie et al. | 260/156 X |
| 3,642,427 | 12/1972 | Berrie et al. | 8/41 B |
| 3,657,214 | 4/1972 | Berrie et al. | 260/156 |
| 3,776,918 | 12/1973 | Hegar et al. | 260/156 X |

FOREIGN PATENTS OR APPLICATIONS

| | | | |
|---|---|---|---|
| 2,141,453 | 2/1972 | Germany | 260/156 |
| 1,901,712 | 9/1969 | Germany | 260/156 |
| 1,901,711 | 4/1970 | Germany | 260/156 |

Primary Examiner—Charles F. Warren
Attorney, Agent, or Firm—Gerald D. Sharkin; Richard E. Vila; Melvyn M. Kassenoff

[57] ABSTRACT

The invention provides novel disperse dyes of formula I,

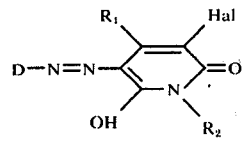

in which
D signifies the radical of a diazo component,
Hal signifies chlorine or bromine,
$R_2$ signifies hydrogen, unsubstituted or substituted amino, or an unsubstituted or substituted hydrocarbon radical which may contain hetero atoms,
and
$R_1$ signifies cyano or a radical —$COOR_3$ or —$CONR_4R_5$, in which $R_3$ signifies unsubstituted or substituted alkyl or phenyl, $R_4$ signifies hydrogen, unsubstituted or substituted amino, or an unsubstituted or substituted hydrocarbon radical which may contain hetero atoms,
and $R_5$ signifies hydrogen or unsubstituted or substituted alkyl or phenyl,
provided that the compounds contain no sulphonic acid radicals.

These dyes are useful for dyeing and printing synthetic and semisynthetic high molecular weight hydrophobic fibers such as aromatic polyesters, synthetic polyamides, secondary cellulose acetate and cellulose triacetate. The dyeings are fast to light, thermofixation, sublimation, pleating, wet treatments, dry cleaning, lubricants, rubbing, cross-dyeing, ozone, gas fumes and chlorine.

26 Claims, No Drawings

AZO DYES HAVING A 3-HALO-4-CYANO OR ACYL-6-HYDROXYPYRIDONE-2 COUPLING COMPONENT RADICAL

This application is a continuation of application Ser. No. 253,410, filed May 15, 1972 and now abandoned.

IMPROVEMENTS IN OR RELATING TO ORGANIC COMPOUNDS

This invention relates to azo dyes of low water solubility and in which the coupling component is a 5-halocitrazinic acid derivative.

More particularly, this invention provides compounds of formula I,

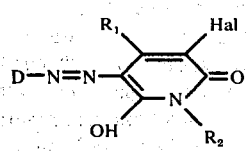

in which
D signifies th radical of a diazo component,
Hal signifies chlorine or bromine;
$R_2$ signifies hydrogen, unsubstituted or substituted amino, or an unsubstituted or substituted hydrocarbon radical which may contan hetero atoms,
and
$R_1$ signifies cyano or a radical —$COOR_3$ or —$CONR_4R_5$, in which $R_3$ signifies unsubstituted or substituted alkyl or phenyl, $R_4$ signifies hydrogen, unsubstituted or substituted amino, or an unsubstituted or substituted hydrocarbon radical which may contain hetero atoms,
and $R_5$ signifies hydrogen or unsubstituted or substituted alkyl or phenyl,
provided that the compounds contain no sulphonic acid radicals.

Suitable diazo components include aromatic hydrocarbon, radicals and heterocyclic radicals of aromatic character, such as pyridyl, thienyl, thiazolyl, benzothiazolyl, benzisothiazolyl, thiadiazolyl, imidazolyl, triazolyl, quinolyl, isoquinolyl, naphthyl and, in particular, phenyl. These radicals may bear substituents conventional in azo dyes, for example halogen, particularly chlorine or bromine, hydroxyl, cyano, thiocyano, nitro, acyl, acyloxy or acylamino, or alkyl, alkoxy, phenyl, phenoxy, alkylmercapto or phenylmercapto which may be unsubstituted or substituted.

Where $R_2$ or $R_4$ signify substituted amino, the amino radical may for example be substituted by one or two unsubstituted or substituted alkyl radicals, by an unsubstituted or substituted phenyl radical, by a heterocyclic radical such as those mentioned above for the diazo component or as morpholino, piperidino or sulpholan radicals, or by two different substituents, e.g. one unsubstituted or substituted alkyl substituent and one phenyl substituent. Preferred acyl substituents include those of formula R—Y—or R'—Z—, in which R signifies an unsubstituted or substituted hydrocarbon radical which may contain hetero atoms, preferably unsubstituted or substituted alkyl or phenyl, Y signifies —O—CO—or —$SO_2$—, R' signifies hydrogen or R, and Z signifies —CO—, —NR"CO— or —NR"$SO^2$— in which R" signifies hydrogen or R.

Suitable hydrocarbon radicals include, in particular, alkyl, phenyl, cycloalkyl, such as cyclohexyl, and unsaturated radicals, such as allyl.

Suitable hydrocarbon radicals containing hetero atoms include the heterocyclic radicals mentioned above in connection with the diazo component and also morpholino, piperidino and sulpholan radicals. Suitable substituents on any substituted such hydrocarbon radicals include those mentioned above in connection with the diazo component.

As used herein, the terms "alkyl" and "alkoxy" mean, unless otherwise indicated, alkyl or alkoxy radicals containing 1 to 6, preferably 1 to 4 carbon atoms. Suitable substituents on any substituted such radical, and indeed on any other substituted radical, include those mentioned above in connection with the diazo component.

The preferred compounds of formula I, are those of formula Ia,

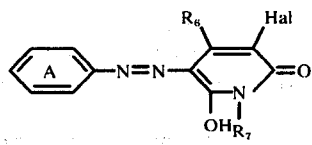

in which ring A may bear one or more substituents selected from chlorine, bromine, nitro, methyl, methoxy, phenyl, phenoxy, chlorophenoxy, bromophenoxy, acetyl, phenoxysulphonyl, phenylsulphonyloxy, dimethylaminocarbonyloxy (dimethylcarbamoyloxy) or dimethylaminosulphonyloxy(dimethylsulfamoyloxy), or alkoxycarbonyl in which the alkoxy group contains 1 to 4 carbon atoms, or benzoyl,
$R_6$ signifies cyano, alkoxycarbonyl, in which the alkoxy radical contains 1 to 4 carbon atoms, phenoxycarbonyl, aminocarbonyl(carbamoyl), alkylaminocarbonyl or dialkylaminocarbonyl in which each alkyl radical contains 1 to 4 carbon atoms, phenylaminocarbonyl, or methoxyalkylaminocarbonyl, in which the alkyl radical contains 1 to 3 carbon atoms,
$R_7$ signifies hydrogen, phenyl, sulpholyl, N-piperidyl, dimethylamino, unsubstituted alkyl of 1 to 3 carbon atoms, or alkyl of 1 to 3 carbon atoms substituted by methoxy, hydroxyl, cyano, acetylamino(acetamido), phenyl or alkoxycarbonyl, in which the alkoxy radical contains 1 or 2 carbon atoms,
and Hal is as defined above.

The compounds of formula I may, in accordance with the invention, be produced by chlorinating or brominating a compound of formula II,

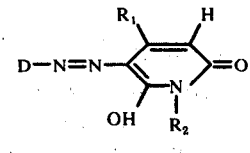

in which D, $R_1$ and $R_2$ are as defined above.

The process is suitably effected in an inert organic solvent, for example a substituted benzene, e.g. nitrobenzene. The process is conveniently carried out by dissolving or suspending the compound of formula II in the solvent, and bubbling chlorine through or adding bromine to the resulting mixture. Alternatively, the chlorine or bromine may be dissolved in a solvent before addition, or the chlorination or bromination may be effected using a chlorine or bromine donor, such as an amide or imide of an N-chloric or N-bromic acid, e.g., N-chloro- or bromo-succinimide, or chloro- or bromophthalimide. Conveniently, the process is effected at a temperature of from 20° to 70° C.

The resulting compounds of formula I may be isolated and purified using conventional techniques.

The compounds of formula II are known or may be prepared in known manner from available materials, for example by conventional coupling of the appropriate diazo and coupling components.

The compounds of formula I may be formulated into dyeing preparations before use in conventional manner, for example by grinding in the presence of dispersing agents and/or fillers, followed by vacuum or atomiser drying if dry products are required. After addition of a suitable quantity of water, the preparations can be applied by known exhaust dyeing, pad dyeing or printing methods (see, for example, French Pat. 1,445,371) at long to short liquor ratios.

The dyes of the invention are suitable for dyeing and printing synthetic and semisynthetic, high molecular weight organic fibres of hydrophobic character, in loose form, as yarn and in other textile forms. From aqueous dispersion they build up well on textile substrates of such fibres. They are particularly suitable for dyeing and printing linear aromatic polyester, synethetic polyamide, secondary cellulose acetate and cellulose triacetate fibres.

The dyeings obtained show good all-round fastness properties, for example with respect to light, thermofixation, sublimation, pleating, wet treatments, such as water, washing, sea water, perspiration, solvents and dry cleaning, and to lubricants, rubbing, cross-dyeing, ozone, gas fumes and chlorine. The dyeings are stable under the conditions of the pre-cure and post-cure permanent press finishing processes and to soil release finishes. Their dischargeability, resistance to reducing action in dyeing with wool and reserve of wool and cotton are also noteworthy.

The new dyes possess, in particular, noteworthy light and sublimation fastness properties and tinctorial strength in relation to similar known dyes.

As will be appreciated, the compounds of formula I, in which $R_2$ is hydrogen exhibit keto-enol type tautomerism. It is be noted that the invention extends to all tautomeric forms. In the following Examples, the parts and percentages are by weight and the temperatures in degrees Centigrade.

EXAMPLE 1

42.8 Parts of 1-methyl-3-[4′-(4″-chlorophenoxy)-phenylazo]-citrazinic acid ethyl ester are stirred into 600 parts of nitrobenzene at room temperature. Over the course of 1 hour, a solution of 16 parts of bromine in 120 parts of nitrobenzene is added, the temperature being kept between about 20° and 25° during this time. After addition, the temperature is increased to 60° and the reaction run for 1 hour at this temperature with stirring. On cooling, the dye of the formula

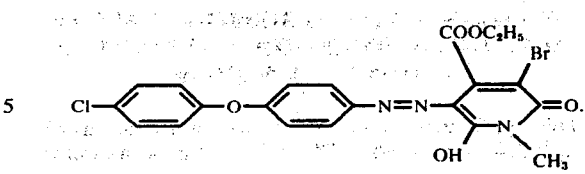

which is precipitated in insoluble form, is isolated by filtration and dried. After conversion into finely divided powder form, this dye is applicable to polyester fibres, on which it builds up to heavy depths and gives fast yellow dyeings.

EXAMPLE 2

71.8 Parts of N-ethyl-3-(2′-nitro-4′-methoxyphenylazo)-citrazinic acid ethyl ester are stirred into 1200 parts of nitrobenzene. A solution of 30 parts of bromine in 360 parts of nitrobenzene is allowed to flow in gradually over 1 hour at room temperature. Subsequently the mixture is raised to 60° and reacted for 1 hour at this temperature with stirring. The dye formed, which has the formula

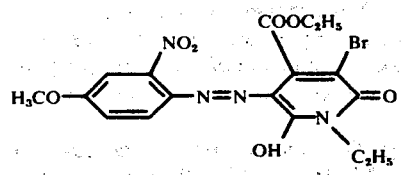

settles out from the cooling reaction medium and is isolated by filtration. It is worked up in a finely divided form, in which it dyes polyester textiles in fast yellow-orange shades.

EXAMPLE 3

A solution of 14 parts of bromine in 120 parts of nitrobenzene is allowed to flow slowly at room temperature into a suspension of 39.5 parts of 3-[3′-(phenoxysulphonyl)-phenylazo]-citrazinic acid n-butyl ester in 600 parts of nitrobenzene. The temperature is increased to 60°, with stirring, and held at this point for 1 hour, with continued stirring. Following cooling and filtration, the dye of the formula

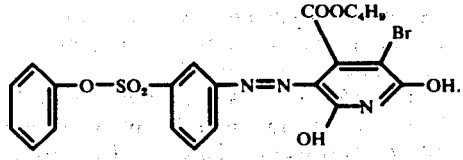

is obtained. It is converted into finely divided form for application to polyester fibres, on which it gives fast dyeings of greenish yellow shade.

EXAMPLE 4

A suspension of 70 parts of 3-(2′-methoxy-4′-nitrophenylazo)-citrazinic acid-(γ-methoxy)-propylamide in 1000 parts of nitrobenzene is prepared. Over the course of 2 hours, 12.3 parts of chlorine, previously liquefied in a cold bath, are evaporated into the suspension. The mixture is then raised to 60° and reacted for 1 hour at this temperature with stirring. The mixture is then evaporated to about one half of its initial volume and cooled. The crystalline dye of the formula

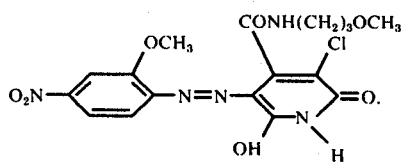

settles out and is isolated by filtration. In finely divided form, it dyes polyester fibres in fast yellow shades.

The follow table indicates further dyes of formula I, stated above, which are produced in manner described in the proceding Examples.

TABLE

| Exp. No. | D - NH$_2$ | R$_1$ | R$_2$ | Hal | Shade on polyester fibre |
|---|---|---|---|---|---|
| 5 | 2-Chloro-4-nitroaniline | —COOC$_2$H$_5$ | H | Cl | yellow |
| 6 | " | —CN | —CH$_2$C$_6$H$_5$ | Cl | " |
| 7 | β-Naphthylamine | —COOC$_2$H$_5$ | —CH$_3$ | Br | " |
| 8 | 2-Aminobenzothiazole | —COOC$_2$H$_5$ | —C$_6$H$_5$ | Br | orange |
| 9 | 2-Methoxy-4-nitroaniline | —CONHC$_2$H$_5$ | —CH$_2$CH$_2$CH$_2$OCH$_3$ | Cl | reddish yellow |
| 10 | 2-Aminothiazole | —COOC$_2$H$_5$ | —CH$_2$CH$_2$OH | Br | " |
| 11 | 4-Ethoxycarbonylaminoaniline | —CONH$_2$ | —CH$_2$CH$_2$CN | Br | " |
| 12 | 2,5-Dichloroaniline | —CONHC$_2$H$_5$ | ⟨SO$_2$⟩ | Br | |
| 13 | 2,5-Dichloroaniline | —CON(CH$_3$)$_2$ | —C$_6$H$_5$ | Br | yellow |
| 14 | 2-Phenylsulphonyloxyaniline | —COOC$_2$H$_5$ | —N(CH$_3$)$_2$ | Br | " |
| 15 | 2-Methyl-4-nitroaniline | —CONHC$_4$H$_9$ | —CH$_3$ | Cl | " |
| 16 | 4-(4'-Chlorophenoxy)-aniline | —COOC$_6$H$_5$ | H | Br | yellow |
| 17 | 2,4-Dichloroaniline | —CN | —CH$_3$ | Cl | " |
| 18 | 2-Nitro-4-chloroaniline | —CON(C$_2$H$_5$)$_2$ | " | Br | reddish yellow |
| 19 | 4-Phenylaniline | —COOC$_2$H$_5$ | —CH$_2$CH$_2$COOC$_2$H$_5$ | Br | yellow |
| 20 | 4-Nitroaniline | —COOC$_4$H$_9$ | —C$_6$H$_5$ | Br | " |
| 21 | 3-Dimethylaminosulphonyl-oxyaniline | —COOC$_2$H$_5$ | H | Br | " |
| 22 | 3-Aminopyridine | —COOC$_2$H$_5$ | H | Cl | " |
| 23 | 2,6-Dichloro-4-nitroaniline | —CONHCH$_3$ | —CH$_2$CH$_2$CH$_2$OCH$_3$ | Br | " |
| 24 | 4-Aminoazobenzene | —CONC$_2$H$_5$ | —CH$_2$CH$_2$CH$_2$OCH$_3$ | Cl | orange |
| 25 | 2-Chloro-4-nitroaniline | —COφC$_2$H$_5$ CH$_3$ | —N⟨ ⟩H | Cl | yellow |
| 26 | 4-Dimethylaminocarbonyl-oxyaniline | —COOCH$_3$ | —CH$_2$CH$_2$NHCOCH$_3$ | Br | " |
| 27 | 4-(4'-Chlorophenoxy)-aniline | —CONHC$_6$H$_5$ | H | Br | " |
| 28 | 4-(4'-Bromophenoxy)-aniline | " | H | Br | " |
| 29 | 4-Phenoxyaniline | " | H | Br | " |
| 30 | 4-Phenylsulphonyloxyaniline | —COOC$_2$H$_5$ | H | Br | yellow |
| 31 | " | " | " | Cl | " |
| 32 | 4-Benzoylaniline | " | " | Cl | " |
| 33 | " | " | " | Br | " |
| 34 | 2-Methoxy-4-nitroaniline | —CONHCH$_3$ | CH$_3$ | Br | " |
| 35 | " | " | " | Cl | " |
| 36 | 4-Ethoxycarbonylaniline | —CONH(CH$_2$)$_3$OCH$_3$ | —(CH$_2$)$_3$OCH$_3$ | Cl | " |
| 37 | " | " | " | Br | " |
| 38 | 2,6-Dichloro-4-nitroaniline | —COO(CH$_2$)$_3$CH$_3$ | H | Cl | " |
| 39 | " | " | " | Br | " |
| 40 | 2-Chloro-4-n-butoxycarbonyl-aniline | —COO-n-C$_4$H$_9$ | H | Br | " |
| 41 | " | " | " | Cl | " |
| 42 | 4-ethoxycarbonylaniline | CONH(CH$_2$)$_3$OCH$_3$ | (CH$_2$)$_3$OH | Cl | |
| 43 | 4-ethoxycarbonylaniline | CONH(CH$_2$)$_3$OCH$_3$ | (CH$_2$)$_3$OH | Br | |

What is claimed is:

1. A compound of the formula

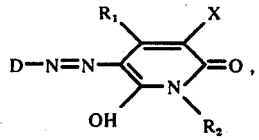

wherein
 D is phenyl, naphthyl, pyridyl, thienyl, thiazolyl, benzothiazolyl, benzoisothiazolyl, thiadiazolyl, imidazolyl, triazolyl, quinolyl or isoquinolyl, or a substituted derivative thereof,
 wherein each substituent of each substituted derivative is independently halo, hydroxy, cyano, thiocyano, nitro, acyl, acyloxy, acylamino, alkyl, alkoxy, phenyl, phenoxy, phenoxy substituted by chlorine or bromine, phenoxysulfonyl, alkylmercapto, phenylmercapto or phenylazo,
 R$_1$ is cyano, —COOR$_3$ or —CONR$_4$R$_5$,
 wherein R$_3$ is alkyl or phenyl,
 R$_4$ is hydrogen, alkyl, alkoxyalkyl, phenyl, amino, alkylamino, dialkylamino, phenylamino, N-alkyl-N-phenylamino, morpholino, piperidino or sulfolyl, and
 R$_5$ is hydrogen, alkyl or phenyl,
 R$_2$ is hydrogen, alkyl, alkyl substituted by alkoxy, hydroxy, cyano, alkylcarbonylamino, phenyl or alkoxycarbonyl, phenyl, amino, alkylamino, dialkylamino, phenylamino, N-alkyl-N-phenylamino, morpholino, piperidino or sulfolyl, and
 X is chloro or bromo,
 wherein each acyl and acyl radical of each acyloxy and acylamino is independently R—Y— or R'—Z—, wherein
R is alkyl or phenyl,
Y is —OCO— or —SO$_2$—,
R' is hydrogen, alkyl or phenyl, and
Z is —CO—, —NR'—CO— or —NR'SO$_2$—, and each alkyl, alkoxy, alkyl moiety and alkoxy moiety independently has 1 to 6 carbon atoms.

2. A compound according to claim 1 having the formula

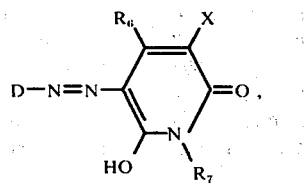

wherein
D is

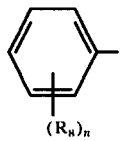

, 2-naphthyl, 2-benzothiazolyl, 2-thiazolyl or 3-pyridyl, wherein each R$_8$ is independently chloro, bromo, nitro, methyl, methoxy, phenyl, phenoxy, chlorophenoxy, bromophenoxy, acetyl, phenoxysulfonyl, phenylsulfonyloxy, dimethylcarbamoyloxy, dimethylsulfamoyloxy, benzoyl, ethoxycarbonylamino, phenylazo or alkoxycarbonyl wherein the alkoxy radical has 1 to 4 carbon atoms, and n is 0 to 3, R$_6$ is cyano, alkoxycarbonyl, phenoxycarbonyl, carbamoyl, alkylcarbamoyl, dialkylcarbamoyl, phenylcarbamoyl or methoxyalkylcarbamoyl, wherein the alkyl radical of alkylcarbamoyl, each alkyl radical of dialkylcarbamoyl and the alkoxy radical of alkoxycarbonyl has 1 to 4 carbon atoms and the alkyl radical of methoxyalkylcarbamoyl has 1 to 3 carbon atoms, R$_7$ is hydrogen, phenyl, sulfolyl, N-piperidino, dimethylamino, alkyl of 1 to 3 carbon atoms or alkyl of 1 to 3 carbon atoms substituted by methoxy, hydroxy, cyano, acetamido, phenyl or alkoxycarbonyl wherein the alkoxy radical has 1 or 2 carbon atoms, and X is chloro or bromo.

3. A compound according to claim 2 wherein D is

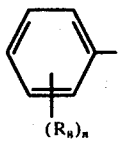

4. A compound according to claim 3 wherein n is 1 to 3.

5. A compound according to claim 3 wherein each R$_8$ is independently chloro, bromo, nitro, methyl, methoxy, phenyl, phenoxy, chlorophenoxy, bromophenoxy, acetyl, phenoxysulfonyl, phenylsulfonyloxy, dimethylcarbamoyloxy, dimethylsulfamoyloxy, benzoyl or alkoxycarbonyl wherein the alkoxy radical has 1 to 4 carbon atoms.

6. A compound according to claim 5 wherein n is 1 to 3.

7. A compound according to claim 5 wherein R$_6$ is alkoxycarbonyl, alkylcarbamoyl or methoxyalkylcarbamoyl,
wherein the alkoxy radical of alkoxycarbonyl and the alkyl radical of alkylcarbamoyl have 1 to 4 carbon atoms and the alkyl radical of methoxyalkylcarbamoyl has 1 to 3 carbon atoms, and
R$_7$ is hydrogen or alkyl of 1 to 3 carbon atoms.

8. A compound according to claim 7 wherein each R$_8$ is independently chloro, nitro, methyl, methoxy, chlorophenoxy, phenoxysulfonyl, phenylsulfonyloxy, dimethylsulfamoyloxy, benzoyl or alkoxycarbonyl wherein the alkoxy radical has 1 to 4 carbon atoms, and n is 1 to 3.

9. A compound according to claim 7 wherein
R$_6$ is alkoxycarbonyl wherein the alkoxy radical has 1 to 4 carbon atoms, and
X is bromo.

10. A compound according to claim 9 wherein
each R$_8$ is independently chloro, nitro, methoxy, chlorophenoxy, phenoxysulfonyl, phenylsulfonyloxy, dimethylsulfamoyloxy, benzoyl or alkoxycarbonyl wherein the alkoxy radical has 1 to 4 carbon atoms, and
n is 1 to 3.

11. The compound according to claim 6 having the formula

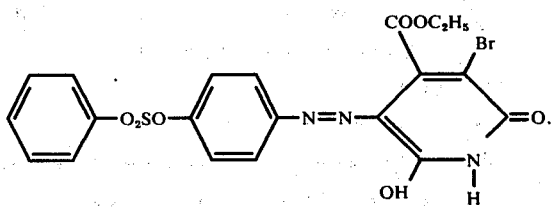

12. The compound according to claim 6 having the formula

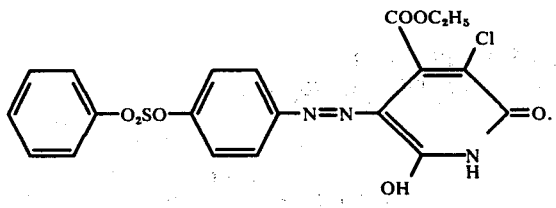

13. The compound according to claim 6 having the formula

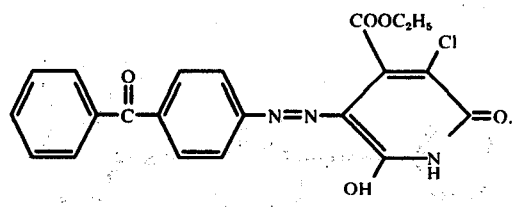

14. The compound according to claim 6 having the formula

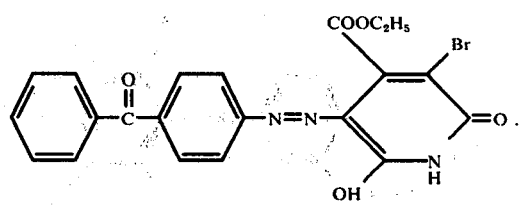

15. The compound according to claim 6 having the formula

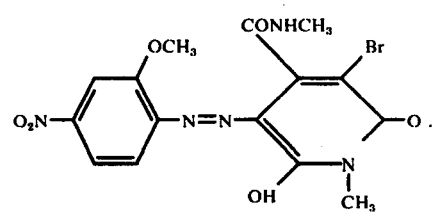

16. The compound according to claim 6 having the formula

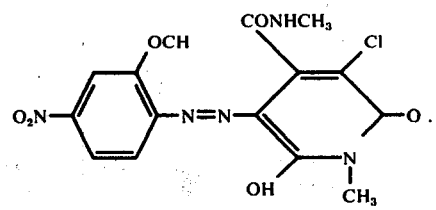

17. The compound according to claim 6 having the formula

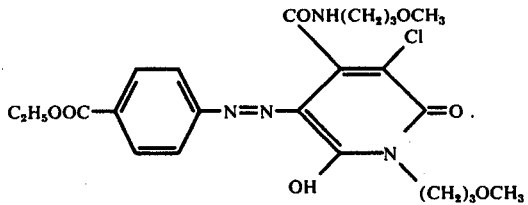

18. The compound according to claim 6 having the formula

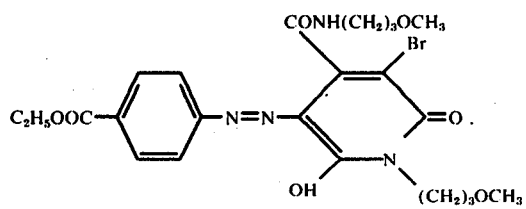

19. The compound according to claim 6 having the formula

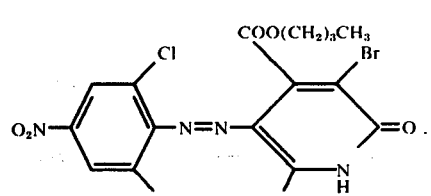

20. The compound according to claim 6 having the formula

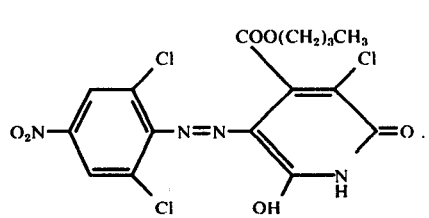

21. The compound according to claim 6 having the formula

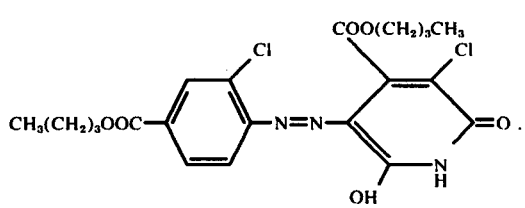

22. The compound according to claim 6 having the formula

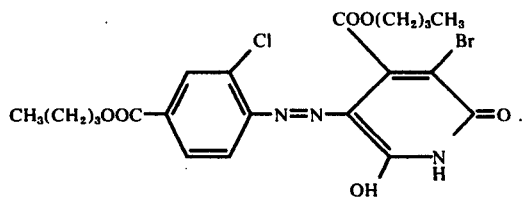

23. The compound according to claim 6 having the formula

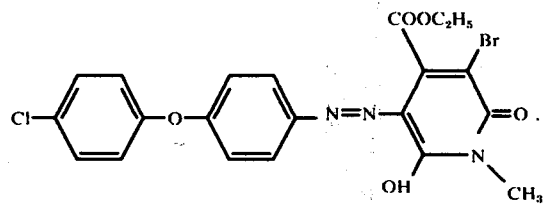
24. The compound according to claim 6 having the formula
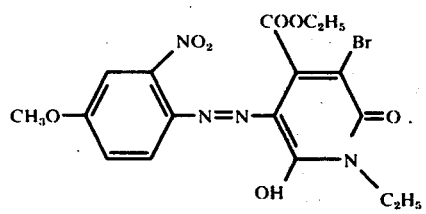
25. The compound according to claim 6 having the formula
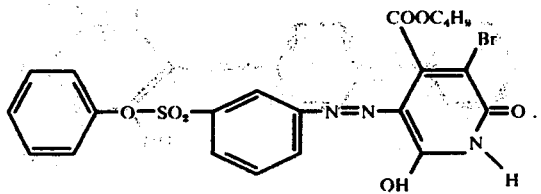
26. The compound according to claim 6 having the formula
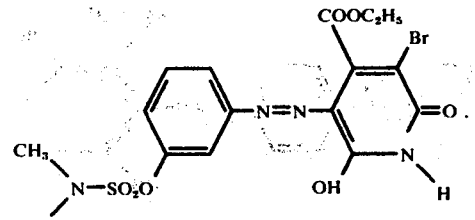
* * * * *